(12) United States Patent
Levasseur et al.

(10) Patent No.: US 9,404,168 B2
(45) Date of Patent: Aug. 2, 2016

(54) CYANIDE-LEACHING PROCESS

(71) Applicant: COREM, Quebec (CA)

(72) Inventors: Benoit Levasseur, Quebec (CA); Eric Proulx, St-Pierre-de-la-Riviere-Sud (CA); Caroline Olsen, Pont-Rouge (CA)

(73) Assignee: COREM, Quebec, Quebec (CA)

( * ) Notice: Subject to any disclaimer, the term of this patent is extended or adjusted under 35 U.S.C. 154(b) by 92 days.

(21) Appl. No.: 14/531,567

(22) Filed: Nov. 3, 2014

(65) Prior Publication Data

US 2015/0125365 A1    May 7, 2015

Related U.S. Application Data

(60) Provisional application No. 61/898,820, filed on Nov. 1, 2013.

(51) Int. Cl.
    *C22B 11/00*    (2006.01)
    *C22B 11/08*    (2006.01)

(52) U.S. Cl.
    CPC ..................... *C22B 11/08* (2013.01)

(58) Field of Classification Search
None
See application file for complete search history.

(56) References Cited

U.S. PATENT DOCUMENTS

| | | | |
|---|---|---|---|
| 3,764,650 A | 10/1973 | Scheiner et al. | |
| 4,431,614 A * | 2/1984 | Makipirtti | C22B 11/00 423/29 |
| 4,642,134 A | 2/1987 | Van Antwerp et al. | |
| 4,647,307 A * | 3/1987 | Raudsepp | C22B 11/04 423/140 |
| 4,719,019 A | 1/1988 | Vasan | |
| 4,999,113 A | 3/1991 | Weber | |
| 5,169,532 A | 12/1992 | Whitlock | |
| 5,336,474 A | 8/1994 | Diehl et al. | |
| 5,344,569 A | 9/1994 | Kawasaki et al. | |
| 5,482,694 A | 1/1996 | Jara et al. | |
| 5,484,470 A | 1/1996 | Kristjansdottir et al. | |
| 5,626,739 A | 5/1997 | Burns et al. | |
| 2004/0197249 A1 | 10/2004 | Wan et al. | |

FOREIGN PATENT DOCUMENTS

| | | |
|---|---|---|
| AU | 642326 B2 | 10/1993 |
| CN | 103409643 A | 11/2013 |
| EP | 0599491 A1 | 6/1994 |
| WO | 0035816 A1 | 6/2000 |
| WO | 2005092793 A1 | 10/2005 |
| WO | 2005100243 A1 | 10/2005 |
| WO | 2012019243 A1 | 2/2012 |

OTHER PUBLICATIONS

Bayat et al., "Effects of oxidising agents on dissolution of Gumuskoy silver ore in cyanide solution" Minerals Engineering 16 (2003) 395-398.

(Continued)

*Primary Examiner* — Steven Bos
(74) *Attorney, Agent, or Firm* — Merchant & Gould

(57) ABSTRACT

A process for recovering a precious metal from ore includes adding process water containing thiocyanates to ore particles to obtain a pulp. The pulp having a basic pH is contacted with an oxidizing gas containing ozone; and the pulp is contacted with cyanide. Contacting the pulp with cyanide can include adding cyanide subsequently to contacting the pulp with the oxidizing gas containing ozone.

21 Claims, 14 Drawing Sheets

(56) References Cited

OTHER PUBLICATIONS

Breuer et al., "Does pre-oxidation or lead (II) addition reduce the impact of iron sulfides in cyanidation?" Hyrometallurgy (2008) Proceedings of the Sixth International Symposium, 750-757.

Ellis et al., "The effects of dissolved oxygen and cyanide dosage on gold extraction from a pyrrhotite-rich ore" Hydrometallurgy 72 (2004) 39-50.

Elorza-Rodriguez et al., "Treatment of pyritic matrix gold-silver refractory ores by ozonization-cyanidation", Minerals Engineering 19 (2006) 56-61.

Gonzalez-Anaya et al.,"Use of Ozone for Gold Extraction from a Highly Refractory Concentrate", Ozone: Science & Engineering 33 (2011) 42-49.

Guzman et al., "Gold cyanidation using hydrogen peroxide", Hydrometallurgy 52 (1999) 21-35.

Li et al., "Pre-oxidation of high-sulfur and high-arsenic refractory gold concentrate by ozone and ferric ions in acidic media" Hydrometallurgy 97 (2009) 61-66.

Marsden et al., C I, "The Chemistry of Gold Extraction" Littleton, Co, USA: (SME) Society for Mining, Metallurgy, and Exploration (2006).

Patino et al., "The use of ozone to improve cyanidation process for silver and gold extraction from a refractory ore" Proc. 27th Conference IPMI (2003) 50-62.

Pedroza et al., "Ozonation Pretreatment of Gold-Silver Pyritic Minerals" Ozone: Science and Engineering, 29 (2007) 307-313.

Soto et al., "Regeneration of cyanide by ozone oxidation of thiocyanate in cyanidation tailings" Minerals Engineering vol. 8, No. 3 (1995) 273-281.

Xie et al., "Use of ferricyanide for gold and silver cyanidation" Transactions of Nonferrous Metals Society of China 19 (2009) 714-718.

* cited by examiner

CYANIDE-LEACHING PROCESS

CROSS-REFERENCE TO RELATED APPLICATIONS

This application claims priority under 35 USC §119(e) of U.S. provisional patent application 61/898,820 filed on Nov. 1, 2013, the specification(s) of which is(are) hereby incorporated by reference.

TECHNICAL FIELD OF THE INVENTION

The technical field relates to a process for recovering precious metals, such as gold and silver, and more particularly, a process for leaching with a cyanide-based leaching solution to recover precious metal.

BACKGROUND

When physical methods for separation cannot secure optimal metal value of an ore, leaching is an alternative for extracting precious metals. For most leaching processes, the ore is first prepared. During this first step, the ore is crushed and grinded, to reduce the particle size of the ore and liberate the precious metal(s) for recovery. This may be followed by a gravity recovery process to recover free precious metal particles, such as free gold particles, before being subjected to leaching.

Then, the ore can be subjected to a pre-oxidation (PO) step to oxidize the sulfides and, thereby, limit their interaction with the leaching solution. During the pre-oxidation step, the pulp including ore particles and process water is contacted with an oxidizing agent such as oxygen, hydrogen-peroxide ($H_2O_2$) and ferricyanide ($Fe(CN)_6^{3-}$).

Following the pre-oxidation step, if any, the ore particles are brought in contact with a leaching solution for some retention time for the leaching solution to react with the particles. For precious metals, such as gold and silver, the leaching solution typically contains cyanide ($CN^-$), a singularly charged anion consisting of one carbon atom and one nitrogen atom joined with a triple bond. During cyanidation, i.e the process of extracting precious metals from an ore, precious metals form complexes with cyanide. Cyanidation is adversely affected by several metal sulfide minerals, such as copper, zinc, and iron, which are generally abundant in precious metal-containing ores. Some of the metal sulfide minerals also dissolve during the cyanidation process. In fact, cyanide will preferentially leach sulfide minerals and react with sulfur to produce thiocyanate, as will be described in more details below. These unwanted reactions consume a significant amount of cyanide and oxygen, which is required for the oxy-cyano-leaching of gold and silver. Leaching kinetics of sulfide minerals are quickly in contact with oxygenated cyanide solutions. Therefore, the solution becomes charged with oxidation products that are mostly metal ions, metallo-cyanide complexes, metal oxides and other sulfur species including thiocyanate, sulfides, polysulfides, thiosulfate, sulfites, sulfates, etc.

The leaching of sulfide minerals containing divalent metals can take place via the following overall reaction (Marsden & House, 2006):

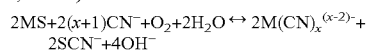

From the reaction above, cyanidation products can be separated into two main categories: metallo-cyanide complexes (i.e., $M(CN)_x^{(x-2)-}$) and sulfur-cyanide complexes (i.e., $SCN^-$).

Formation of thiocyanates ($SCN^-$) reduces the cyanide quantity available for precious metal lixiviation. The formation of thiocyanates is also known to cause an increase in cyanide consumption and, thus in process costs. For other reasons, it is generally desirable to optimize the cyanide consumption during precious metal cyanidation and minimize thiocyanate formation. Furthermore, thiocyanates are highly toxic and cannot be released back to the environment without being treated.

Pre-oxidation of the sulfide minerals could result in the formation of several oxy-sulfur species leading the encapsulated precious metal to be amenable to a cost-effective cyanidation. In recent years, different oxidizing agents have been tested in both pre-oxidation and cyanidation (Bayat, O, Vapur, H, Akyol, F and Poole, C, 2003. Effects of oxidising agents on dissolution of Gumuskoy silver ore. Minerals Engineering, 16: 395-398), (Xie, F and Dresinger, D B, 2009. Use of ferricyanide for gold and silver cyanidation. Transactions of Nonferrous Metals Society of China, 19(3): pp. 714-718), (Breuer, P, Hewitt, D and Meakin, R L, 2008. Does pre-oxidation or lead (II) addition reduce the impact of iron sulfides in cyanidation, Hyrometallurgy 2008: Proceedings of the Sixth International Symposium, 750-757) and (Ellis, S and Senanayake, G, 2004. The effects of dissolved oxygen and cyanide dosage on gold extraction from a pyrrhotite-rich ore. Hydrometallurgy, 72: 39-50). Single or atmospheric oxygen are used as a common source of oxygen. However, their application may not be practically efficient due to their low solubility in the slurry, insufficient aeration, high viscosity of the slurry and strong oxygen-consuming pulps. Alternative oxidants such as hydrogen peroxide, ferricyanide and ozone have also been studied as an oxygen precursor at a laboratory scale (Xie & Dresinger, 2009), (Guzman, L, Segarra, M, Chimenos, J M, Fernandez, M A and Espiell, F, 1999. Gold cyanidation using hydrogen peroxide. Hydrometallurgy, 52: 21-35), (Pedroza, F R C, Aguilara, M J S, Luévanos, A M and Anaya, J A G, 2007. Ozonation Pretreatment of Gold-Silver Pyritic. Ozone: Science & Engineering, 29(4): 307-313).

There is thus a need to reduce thiocyanates accumulation during cyanide-based leaching processes.

BRIEF SUMMARY OF THE INVENTION

It is therefore an aim of the present invention to address the above mentioned issues.

In one aspect, there is provided a process for recovering a precious metal from ore. The process includes:
adding process water containing thiocyanates to ore particles to obtain a pulp;
contacting the pulp having a basic pH with an oxidizing gas containing ozone; and
contacting the pulp with cyanide.

In an optional aspect of the process, contacting the pulp with cyanide may further include adding cyanide to the pulp, subsequently to contacting the pulp with the oxidizing gas containing ozone.

In another optional aspect of the process, contacting the pulp with the oxidizing gas containing ozone and contacting the pulp with cyanide may at least be performed simultaneously, the thiocyanates being converted to cyanide by contact with the oxidizing gas containing ozone.

In another optional aspect of the process, the process water containing thiocyanates added to the ore particles may include recycled process water.

In another optional aspect of the process, the process may include recovering the precious metal from the pulp after cyanidation thereof and producing the process water containing thiocyanates.

In another optional aspect of the process, the process may include recycling at least a part of the process water containing thiocyanates to form the pulp with the ore particles.

In another optional aspect of the process, the process may include controlling the pH of the pulp above 7 while contacting the pulp with the oxidizing gas containing ozone.

In another optional aspect of the process, the pulp may have a pH above 10 when contacted with the oxidizing gas containing ozone.

In another optional aspect of the process, the pulp may have a pH between about 10.5 and 11.5 when contacted with the oxidizing gas containing ozone.

In another optional aspect of the process, the pH of the pulp when the cyanide is added thereto may be substantially equal to the pH of the pulp when the pulp is contacted with the oxidizing gas containing ozone.

In another optional aspect of the process, the process may include monitoring at least one of a thiocyanate concentration, a cyanide concentration and a precious metal recovery percentage after contacting pulp with cyanide.

In another optional aspect of the process, the process may include controlling at least one of an ozone flowrate, in gram of ozone per hour per kilogram of dry ore in the pulp, and an oxidation residence time to destroy at least 20 wt % of the thiocyanates initially contained in the process water.

In another optional aspect of the process, the process may include controlling at least one of the ozone flowrate and the oxidation residence time to destroy at least 90 wt % of the thiocyanates initially contained in the process water.

In another optional aspect of the process, the pulp may be substantially free of thiocyanate before adding cyanide to the pulp.

In another optional aspect of the process, the oxidizing gas containing ozone may have an ozone concentration ranging between 1% and 10%.

In another optional aspect of the process, the oxidizing gas containing ozone may include a mixture of ozone and oxygen.

In another optional aspect of the process, the pulp may have a temperature between about 12° C. and 50° C. when contacting the pulp with the oxidizing gas containing ozone.

In another optional aspect of the process, the pulp may have a temperature between about 12° C. and 50° C.

In another optional aspect of the process, contacting the pulp with the oxidizing gas containing ozone lasts an oxidation time sufficient to destroy at least 20 wt % of the thiocyanates initially contained in the process water. Optionally, the oxidation time may be sufficient to oxidize substantially all the thiocyanates initially contained in the process water. Optionally, the oxidation time may be at most three hours.

The present document refers to a number of documents, the contents of which are hereby incorporated by reference in their entirety.

BRIEF DESCRIPTION OF THE DRAWINGS

FIG. 1 includes FIG. 1A, FIG. 1B and FIG. 1C.

It will be noted that throughout the appended drawings, like features are identified by like reference numerals.

DETAILED DESCRIPTION

Figure 1A:
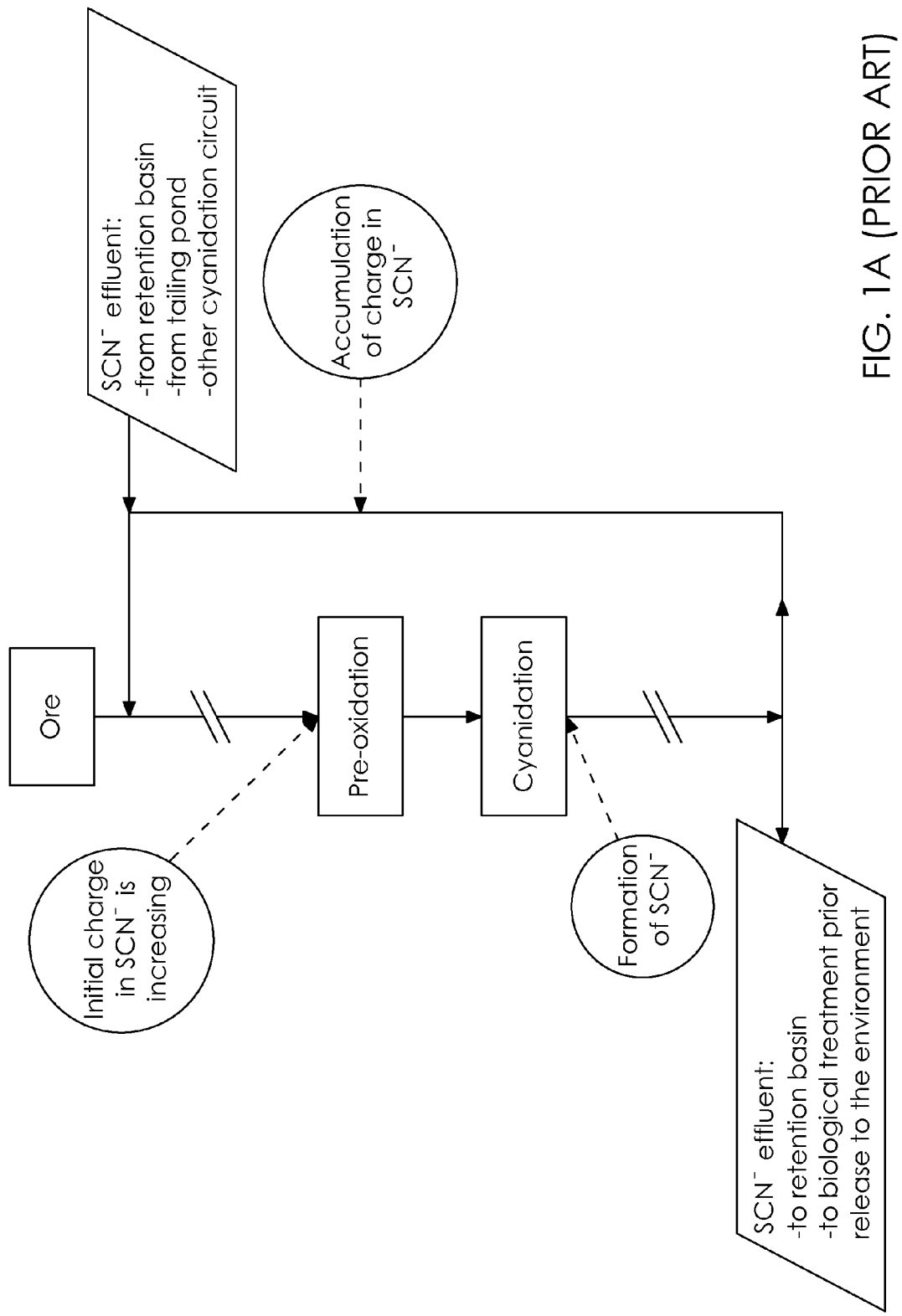
FIG. 1A is a schematic flowchart of an embodiment of a prior art cyanide-based leaching process.

Referring now to the drawings and, more particularly, referring to FIG. 1, there is shown one embodiment of a process for reducing thiocyanate in a process for leaching precious metals, such as gold and silver. More particularly, the process shown in FIG. 1a represents a simplified cyanidation circuit to recover precious metals.

Ore particles including the precious metal(s) are first provided. This step can include crushing and grinding the ore to reduce the particle size and liberate the precious metal(s) for recovery. It can also include a gravity recovery process to recover free precious metal particles, such as free gold particles, before being subjected to leaching. In an embodiment, the ore is a sulphidic ore including one or several precious metal(s) to be recovered.

Then, process water is added to the ore particles to obtain a pulp with a higher solid percentage. At least part of the process water is recirculated following cyanidation and added to new ore particles being treated. Process water can also include water supplied from retention basin(s) or other cyanidation circuit(s). It should be understood that pulp refers to a mixture of a liquid, such as water, and ore that has been previously crushed into particles having a particle size characterized by a p80 ranging from 55 μm to 150 μm, i.e. p80 is the average particle size as determined by a screen on which 20% by weight of the particles will remain and 80% will pass. Optionally, 80% of the ore particles may have a particle size of at most 75 μm. In one embodiment, the process water can include thiocyanates ions $SCN^-$ (also referred to herein as thiocyanates), thiosulfates ions $S_2O_3^{2-}$ (also referred to herein as thiosulfates) or a combination thereof.

By recirculating process water in the cyanidation circuit, thiocyanates contained in the process water following cyanidation and/or from the retention basin(s) and/or other cyanidation circuit(s) and/or tailing ponds are also recirculated. The charge in thiocyanates in the process water typically increases with the recirculation of process water.

Then, a pre-oxidation step, which will be described in more details below, can be performed on the pulp including ore particles and process water.

In some implementations, following the pre-oxidation step, a leaching solution is added to the pulp including ore particles and process water. During the cyanidation step, thiocyanates are formed.

Then, dissolved precious metals are recovered by known methods such as Merrill-Crowe, carbon-in-pulp (CIP), and resin-in-pulp (RIP).

As mentioned above, at least part of the process water following the precious metal recovery step(s) is recycled in the cyanidation circuit and added to new ore particles. Thiocyanates are thus also recirculated in the cyanidation circuit and the charge of thiocyanates in the cyanidation circuit is increasing as new thiocyanates are formed in the cyanidation step and recycled with the process water.

To reduce the thiocyanates in the circuit, part of process water can be sent to retention basin(s) and/or to biological treatment unit(s). However, as the amount of thiocyanates in the circuit increases, the amount of thiocyanates sent to the biological treatment unit(s) also increases. The biological treatment unit(s) can only clean the effluent up to a maximum level of thiocyanates.

Figure 1B:
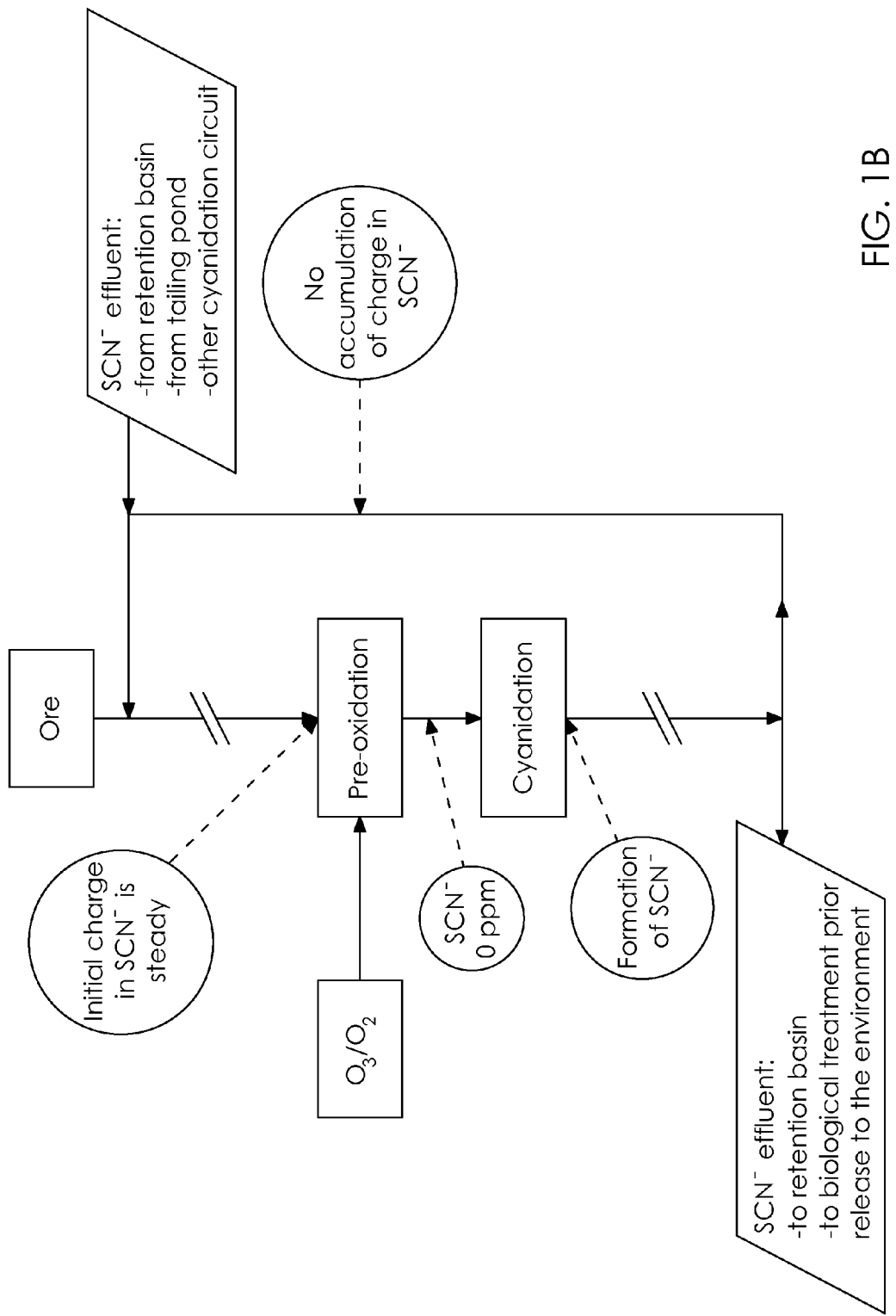
FIG. 1B is a schematic flowchart of an embodiment of a cyanide-based leaching process including an oxidation with an oxidizing gas containing ozone prior to supplemental cyanidation with addition of cyanide and FIG. 1C is another schematic flowchart of an embodiment of a cyanide-based leaching process including simultaneous oxidation with an oxidizing gas containing ozone and cyanidation, referred to as leaching.

Referring now to FIG. 1b, to destroy thiocyanates within the cyanidation process, the pulp is contacted with an oxidizing gas containing ozone ($O_3$) during a pre-oxidation step to form an oxidized pulp containing regenerated cyanides. In some implementations, the process is operated continuously, such that the oxidized pulp is continuously transferred from a pre-oxidation unit, such as pre-oxidation tank(s), to a cyanidation unit, such as cyanidation tanks, wherein additional cyanide is added to the oxidized pulp. In some implementations, the residence time of the pulp in the oxidation unit and/or the ozone flowrate provided to the oxidation unit may be controlled to optimize the destruction of thiocyanates and even completely convert thiocyanates from the pulp into cyanide. It should be understood that the process steps are not limited to be operated continuously and may be operated in batch mode.

Addition of ozone during the oxidation step decreases the thiocyanate charge. The destruction of thiocyanates by ozone occurs in two steps:

Thiocyanate is first oxidized into cyanide according to the following equation (i):

$$SCN^- + 3O_3 + 2OH^- \rightarrow CN^- + SO_4^{2-} + 3O_2 + H_2O \quad (i)$$

Then, cyanide formed can be further oxidized into cyanate according to the following equation (ii):

$$CN^- + O_3 \rightarrow CNO^- + O_2 \quad (ii)$$

In presence of an initial content of thiosulfate in the process water, thiocyanate can be formed again by consuming cyanide according to the following equation (iii):

$$S_2O_3^{2-} + CN^- \rightarrow SCN^- + SO_3^{2-} \quad (iii)$$

All these reactions are relatively fast and are mass transfer controlled. In some implementations, process operating conditions, including ozone flowrate or pre-oxidation residence time of process water, may be controlled to reduce or prevent reactions according to equations (ii) or (iii) from happening, thereby consuming desirable cyanide and/or producing additional thiosulfates.

The pre-oxidation step is carried at a basic pH and the following cyanidation step can be carried out without pH adjustment inbetween. In some implementations, the pH of the pulp during the pre-oxidation and the cyanidation step is above about 7. In other implementations, the pH of the pulp during the pre-oxidation and the cyanidation step is above about 10 and, in an embodiment, between about 10.5 and 11.5. In an embodiment, the pH is approximately 11 This pH corresponds to a suitable pH for a process for leaching precious metals. Operation in a basic pulp may reduce formation of gaseous cyanide in comparison to in acidic pulp, which facilitates in-situ pH controlling and reduces risks of health issues for operators. In an implementation, the cyanidation step, following the pre-oxidation, is carried out is carried out without pH adjustment inbetween.

The pre-oxidation step is carried at ambient temperature. The addition of ozone is performed directly on the pulp including a mixture of process water and ore particles. No solid-liquid separation is performed. In an embodiment, the pulp consistency is between about 40 wt % and 60 wt %. In an embodiment, the pulp consistency is between about 45 wt % and 55 wt %.

In an embodiment, the ozone is added as an oxidizing gas containing ozone. In this specification, the oxidizing gas containing ozone should be understood as any suitable gas containing at least ozone as an oxidizing agent. The oxidizing gas can further comprise oxygen or air. The ozone concentration in the gas may range between about 1% and about 10%. Optionally the ozone concentration in the gas may range between about 2% and about 7%. Further optionally, the ozone concentration may be about 2.5%.

In an embodiment, the ozone is added in a concentration ranging between 0.3 gram of ozone per liter of pulp (g/L) and 3 g/L. In another embodiment, the ozone is added in a concentration ranging between 1 gram of ozone per liter of pulp (g/L) and 3 g/L. Optionally, the process can include controlling an ozone dosage in the oxidizing gas between 1 g/L and 3 g/L of pulp. Further optionally, the flow rate of the oxidizing gas containing ozone can range between 0.36 g($O_3$)/h/kg of dry ore and 5.4 g($O_3$)/h/kg to obtain the ozone dosage between 1 g/L and 3 g/L of pulp, considering an ozone concentration in the oxidizing gas of about 2.5%. It should be understood that various ranges of ozone flowrate may be used in the process according to the ozone concentration range in the oxidizing gas. However, performance in destruction of thiocyanates and precious metal recovery may vary according to these same ranges, as will be demonstrated in the following examples.

In an embodiment, the ozone is generated with an ozone generator such as a corona discharge ozone generator and a UV ozone generator. For the UV ozone generator, an oxygen flowrate flows in a chamber containing a UV lamp having a wave length of 185 nm and 254 nm. The ozone concentration depends on the oxygen flowrate. The ozone can be added above the oxidation tank(s) in which the pulp circulates.

In an embodiment, the pre-oxidation step and the following cyanidation step are carried out in substantially the same operating conditions (temperature, pH, pulp consistency, and the like). No adjustment of the operating conditions is required between the two steps, whether the process steps are performed in a continuous mode or batch mode.

It was observed that carrying out an oxidation in the presence of ozone also stabilizes the charge of thiocyanates in recycled process water and upstream the oxidation step instead of having a gradually increasing thiocyanate charge. Furthermore, in some implementations, the pulp entering the cyanidation step, following the pre-oxidation step in which the pulp is contacted with an oxidizing gas containing ozone, can be substantially free of thiocyanates.

The oxidation with ozone destroys thiocyanates and produces cyanide. Therefore, at least partially leaching of the precious metal, without additional cyanide and/or thiocyanate addition, may occur during the oxidation step.

Figure 1C:
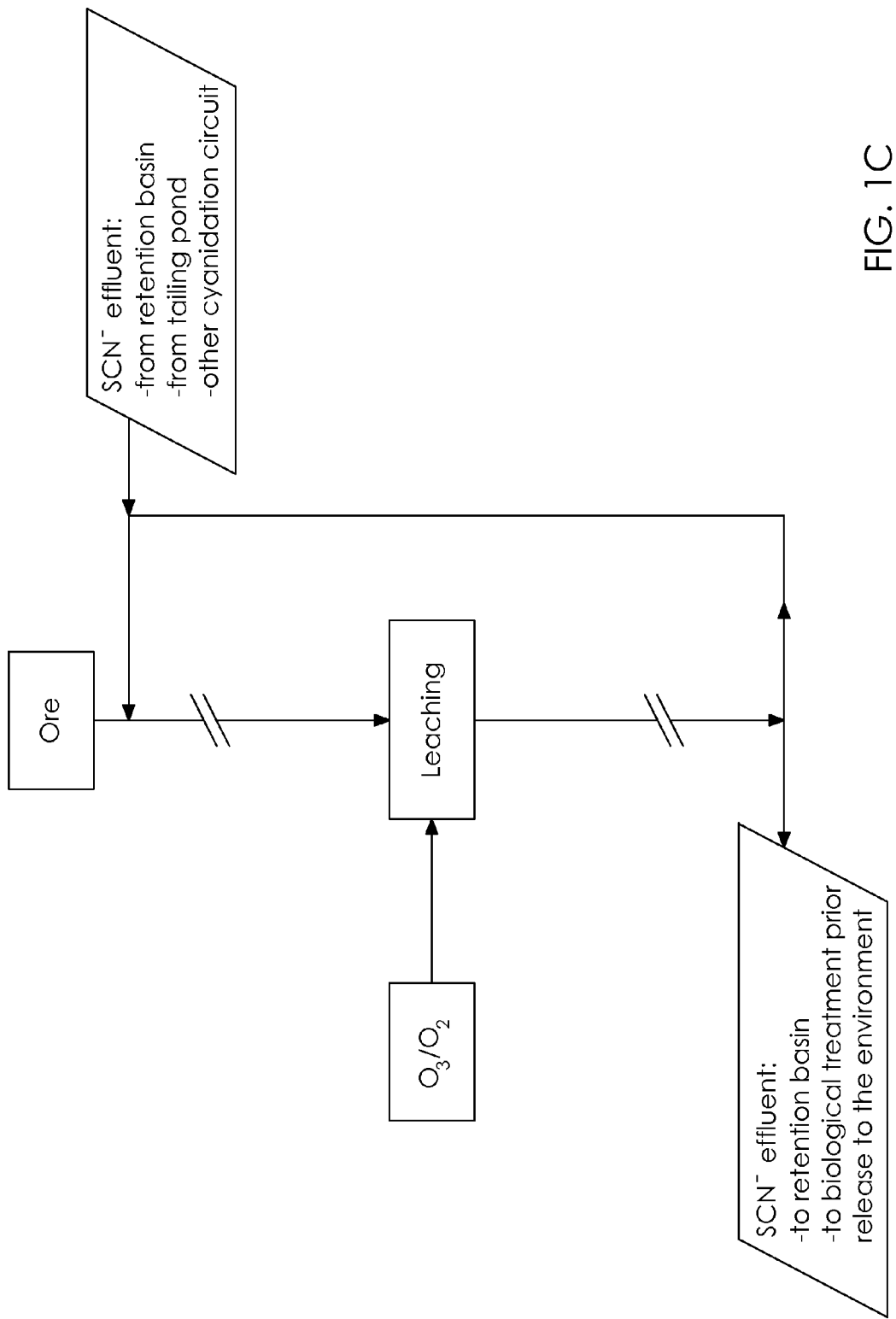

In an embodiment, as shown in FIG. 1C, the subsequent cyanidation step may be optional. Indeed, the quantity of cyanide generated from thiocyanates during the pre-oxidation step may be sufficient to at least partially leach the precious metal from the oxidized pulp, without having to perform an addition of cyanide in the further cyanidation step. In one embodiment, when the process does not include a cyanidation step wherein cyanides are additionally provided, the pre-oxidation step may be referred to as an oxidation step or leaching step. In alternative implementations, the process may optionally include a cyanidation step according to the quantity of precious metal to be recovered, as shown in FIG. 1B.

Referring to FIG. 1C, prior the leaching step, thiocyanate-containing process water is added to ore particles to form the pulp. In the leaching step, at least part of the available thiocyanates is thereby converted to a given quantity of cyanides, which is available for the cyanidation of desirable metals from ore particles. Consequently, thiocyanates may be destroyed or recycled for cyanidation under oxidizing conditions. In some implementations, the process includes a single step in which thiocyanates are converted into cyanide and desirable metals are recovered under oxidizing conditions with ozone. In one embodiment, the oxidation of the pulp with the oxidizing gas containing ozone destroys at least 90 wt % of the thiocyanates initially contained in the process water.

In some implementation, thiocyanates can be added during the oxidation step to produce an additional quantity of cyanide to recover most of the desirable precious metals.

In this specification, the expression "oxidation step" is intended to mean a process step wherein the pulp is contacted with an oxidizing gas. It includes a pre-oxidation where the pulp is contacted with the oxidizing gas prior to cyanide addition, as will be described in more detail below. It also includes a leaching step including simultaneous oxidation/cyanidation carried out without subsequent cyanide addition.

In an embodiment, the process can include controlling the amount of cyanides added to the pulp for cyanidation thereof during the subsequent cyanidation step to maintain an acceptable concentration of thiocyanates in the recycled process water.

With specific mineralogy of refractory ore, the destruction of thiocyanates with an oxidizing gas containing ozone might lead to the leaching of few metals, including arsenic and antimony, simultaneously with the destruction of thiocyanates. Leaching of such metals can cause undesirable effects on the subsequent process steps including cyanidation. The presence of these metals in solution may indeed result in a large loss in gold recovery due to passivation phenomenon and a strong toxicity of the final effluent. Thus, in some implementations, the ore is substantially free of arsenic and antimony.

The destruction of thiocyanate with an oxidizing gas containing ozone may also favor the leaching of desirable metals from ore as cyanide anions are formed. In some implementations, the recovery of desirable metals from ore may be increased by using a process including oxidation with an oxidizing gas containing ozone (see Examples section).

EXAMPLES

Figure 2:
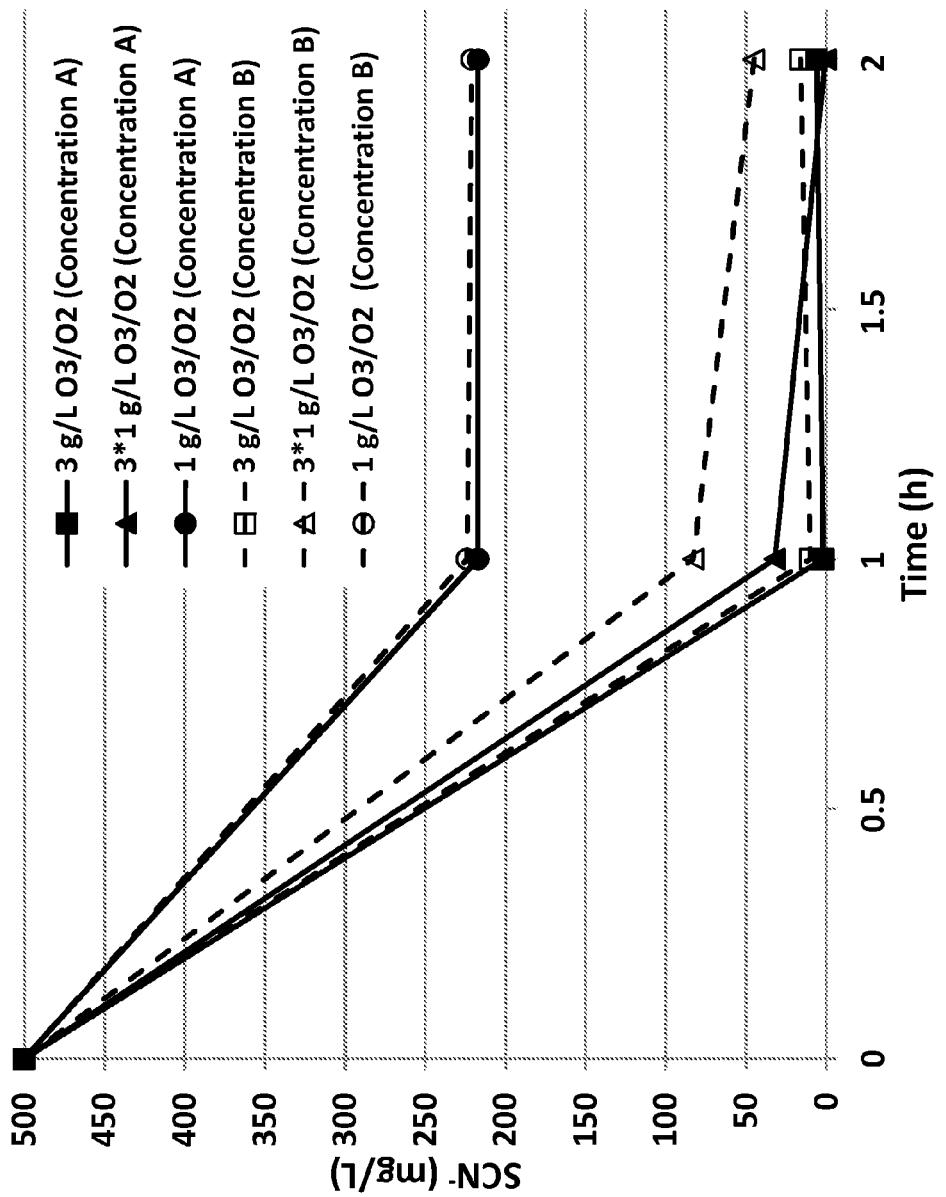
FIG. 2 is a graph showing thiocyanate destruction during an oxidation step, wherein a thiocyanate containing pulp is oxidized with an oxidizing gas containing ozone and oxygen according to two concentrations of ozone in oxygen and various ozone dosages.

Some tests of oxidation with an oxidizing gas including a mixture of oxygen and ozone were carried out on industrial flotation tailing with an initial charge of 500 ppm in thiocyanates (hereinafter "PW" for process water) or with only distilled water (hereinafter "DW"). Three dosages were tested: 3 grams of ozone per liter of pulp, three times 1 gram of ozone per liter of pulp, and 1 gram of ozone per liter of pulp. In the case three times 1 gram of ozone per liter of pulp were added, the additions were performed successively every 30 minutes, such that 3 grams of ozone were totally added to DW after 1 hour. Tests were carried out with two different concentrations of ozone in oxygen (concentration A: 2.5% and concentration B: 1%). As shown in FIG. 2, it was observed that for concentrations A and B, and under specific dosage of ozone, all the thiocyanates were substantially destroyed after one hour of oxidation step. More particularly, best results were obtained with 3 grams of ozone per liter of pulp. Multiple additions of ozone (3*1 g/L) was slightly less efficient than a massive addition (3 g/L).

Figure 3:
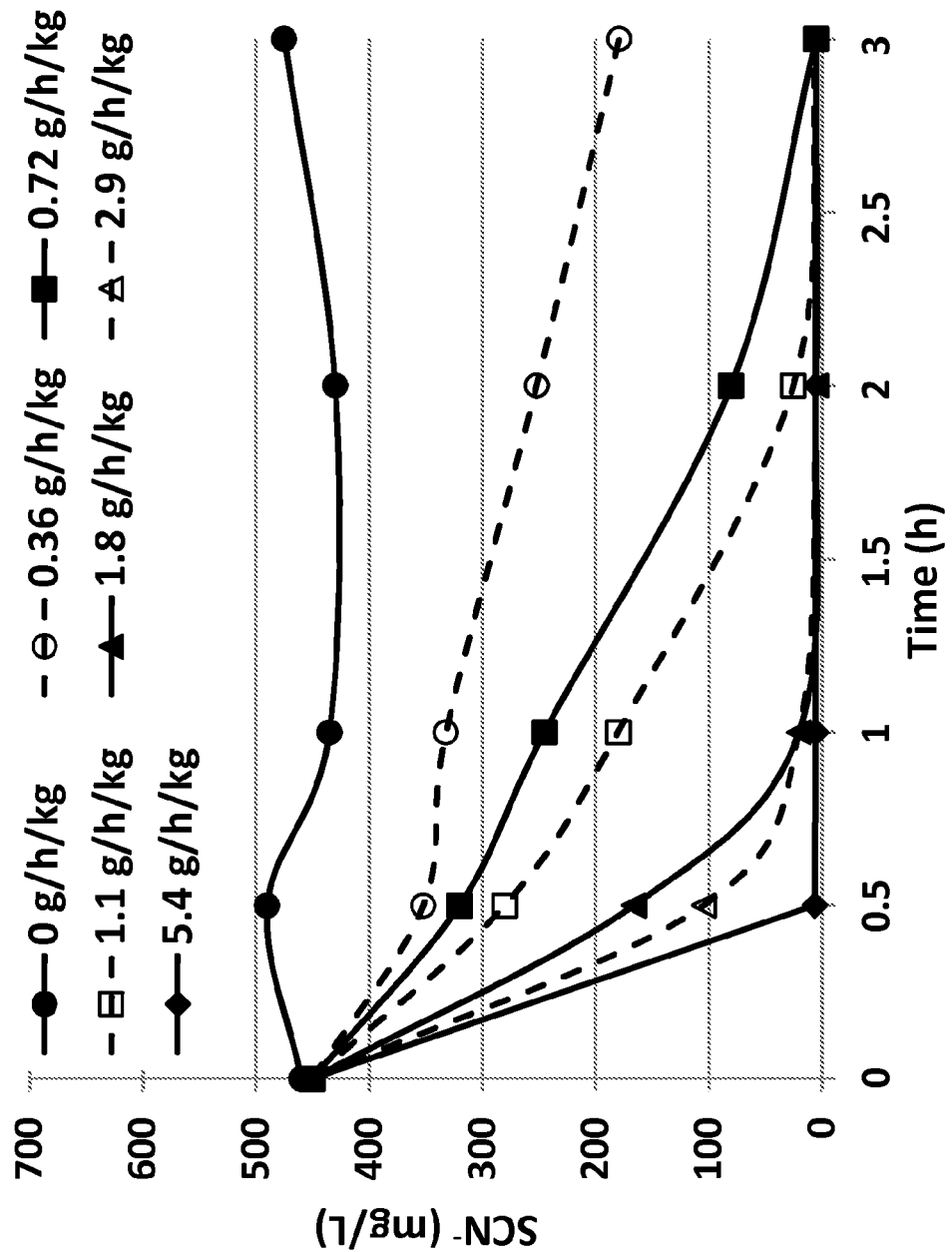
FIG. 3 is a graph showing thiocyanate destruction during an oxidation step, wherein a thiocyanate containing pulp is oxidized with an oxidizing gas containing ozone and oxygen according to various ozone flowrates.

FIG. 3 provides similar results in a graph showing the destruction profile of thiocyanate according to the ozone flowrate in gram of ozone per hour per kg of dry ore in the pulp (g/h/kg) during pre-oxidation. Again, the best results are obtained for an ozone flowrate of 5.4 g/h/kg (corresponding to an ozone dosage of 3 g/L based on a concentration in $O_3/O_2$ of 2.5%). For each ozone flowrate, there is a corresponding thiocyanate destruction speed. It may therefore be possible to control the flowrate of ozone to reach a given thiocyanate concentration in the treated pulp or in the recycled process water. The process may also include controlling the flowrate of ozone to completely destruct thiocyanates from the pulp.

Figure 4:
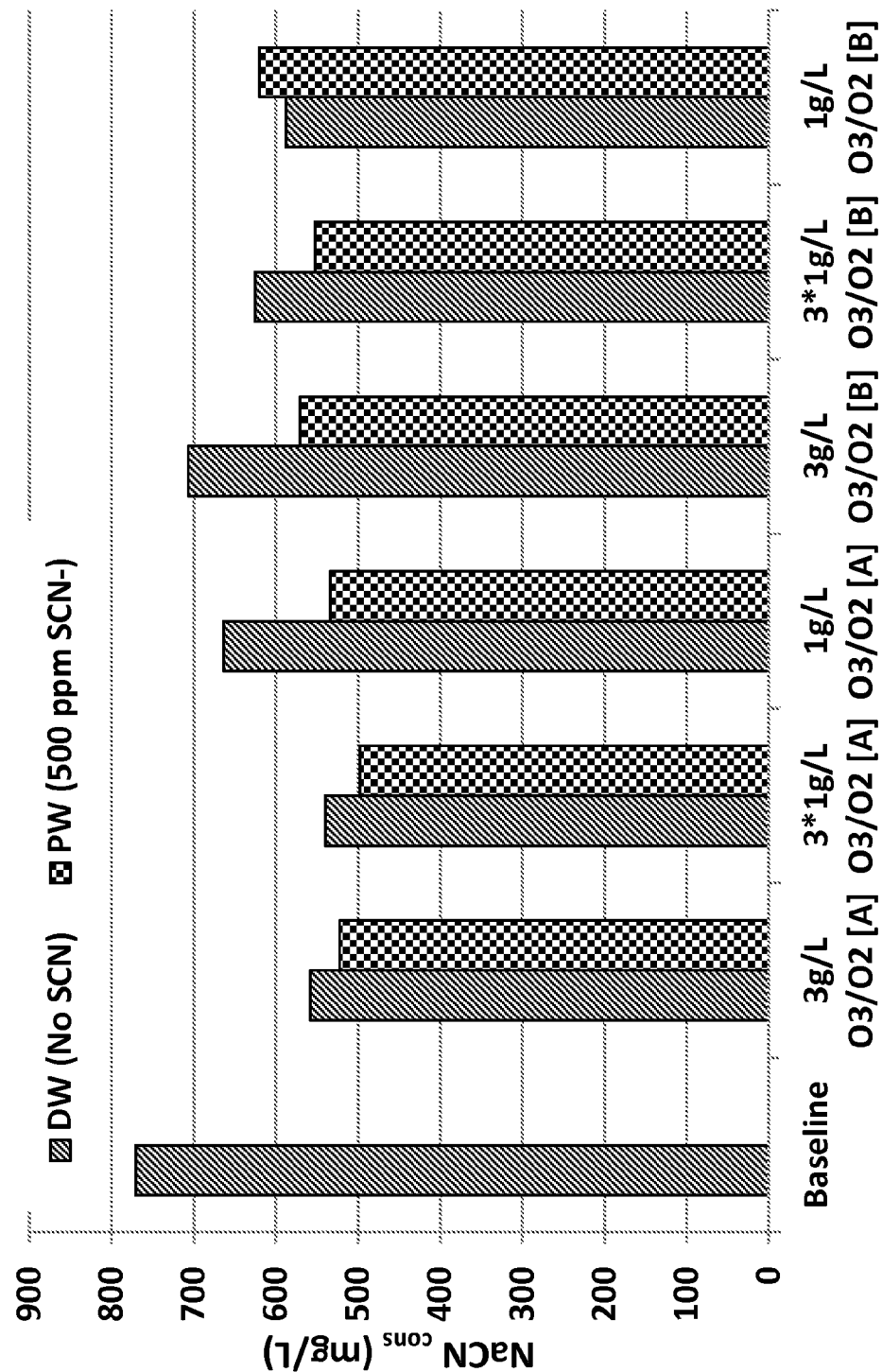
FIG. 4 is a graph showing cyanide consumption during gold cyanidation after pre-oxidation with an oxidizing gas containing ozone and oxygen according to two concentrations of ozone in oxygen and various ozone dosages in distilled water (DW) or process water (PW)

FIG. 4 shows the cyanide consumption during the gold cyanidation step that followed a pre-oxidation step with ozone for three hours. More particularly, a first test was carried out with a pre-oxidation step with oxygen only (i.e. without ozone), identified as baseline in FIG. 4. This led to the highest cyanide (NaCN) consumption during subsequent gold cyanidation. Then, six tests were carried out with ozone dosages (3 g/L, three times 1 g/L, and 1 g/L) with a mixture of ozone and oxygen ($O_3/O_2$) at the two concentrations A and B (concentration A: 2.5% and concentration B: 1%). The subsequent cyanidation step was carried out during twenty-one hours. As shown in FIG. 4, the pre-oxidation step with a mixture of ozone and oxygen lowered the cyanide consumption during the following gold cyanidation process. It should be noted that the kinetics of the chemical reactions depend on the quantity of the chemical species in the pulp. In some implementations, the process may include monitoring the concentration of the chemical species in the pulp, such as cyanide and/or thiocyanate, to tailor the operating conditions of the process so as to reach a pre-determined goal. The pre-determined goal can include a given quantity of precious metal to be leached, a given concentration of thiocyanate in the recycled process water or a combination thereof. For instance, the operating conditions may be tailored to reach a zero concentration of thiocyanate in the recycled process water. Optionally, the operating conditions can include the ozone flowrate provided to the pulp, the ozone dosage of the pulp during oxidation and the residence time of the pulp during oxidation.

Regardless of the ozone dosage, the addition of ozone during pre-oxidation led to a decrease of the cyanide consumption during gold cyanidation. Almost 33 wt % of cyanide was saved with a dosage of 3 g/L in ozone after 3 hours of cyanidation.

Figure 5:
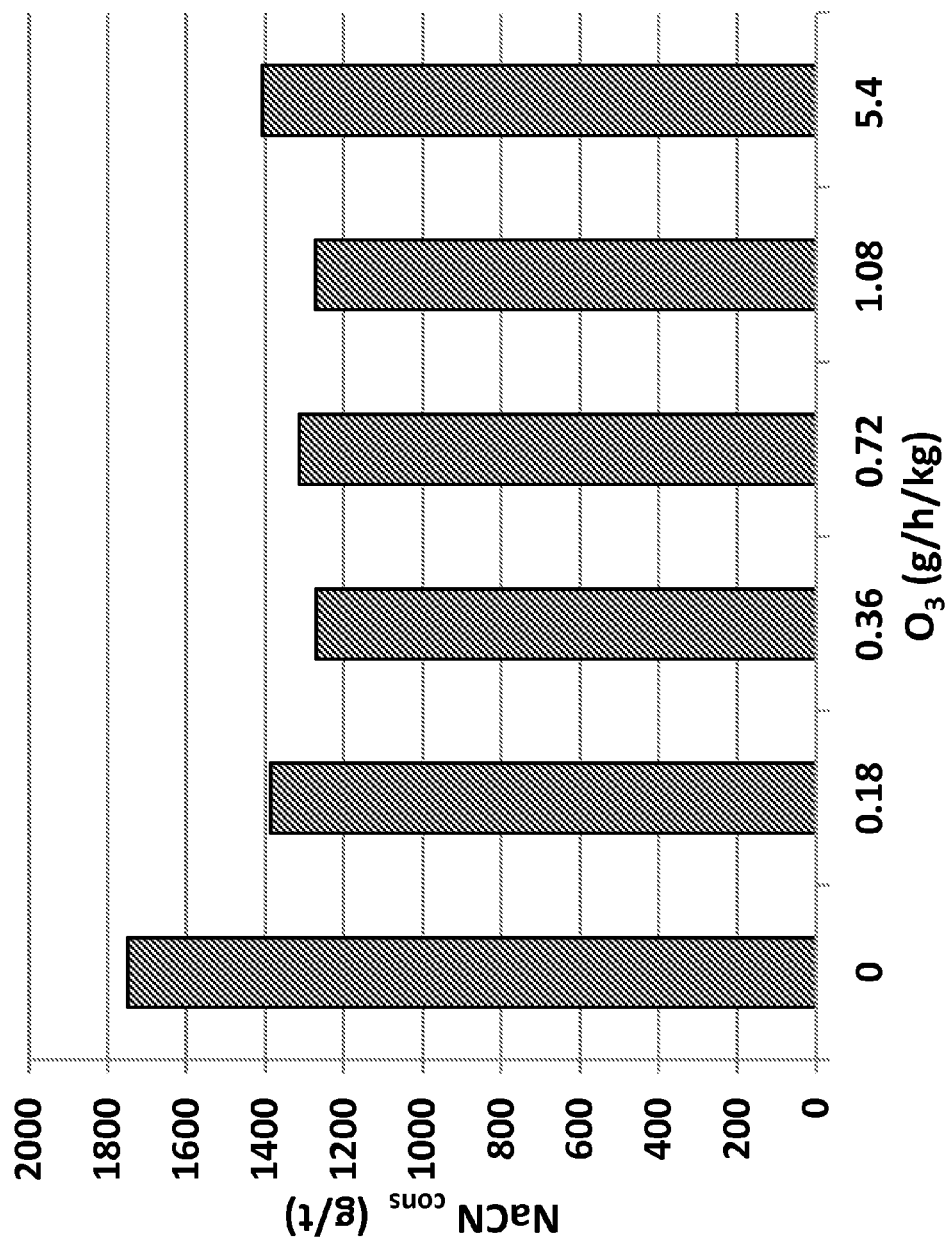
FIG. 5 is a graph showing cyanide consumption after 3 hours of pre-oxidation followed by 21 hours of gold cyanidation, wherein the pre-oxidation is carried out with an oxidizing gas containing ozone and oxygen, according to various ozone flowrates.

Other experimental results were also observed after 3 hours of pre-oxidation followed by 21 hours of cyanidation (shown in FIG. 5) and lead to the same above conclusion for different ozone flowrates (from 0 to 5.4 g/h/kg). As can be seen in Table 1, carrying out pre-oxidation step with a mixture of $O_3/O_2$ enables to gain up to 27% of cyanides, which are available for cyanidation.

TABLE 1

| | $O_3$ (g/h/kg) | | | | |
|---|---|---|---|---|---|
| | 0.18 | 0.36 | 0.72 | 1.1 | 5.4 |
| NaCN gain (%) | 21 | 27 | 25 | 27 | 20 |

Referring to Table 1, NaCN gain is calculated as follows:

for 0.36 g($O_3$)/h/kg: (1760 g/t−1280 g/t)/(1760 g/t)
=0.27 (27%)

Figure 6:
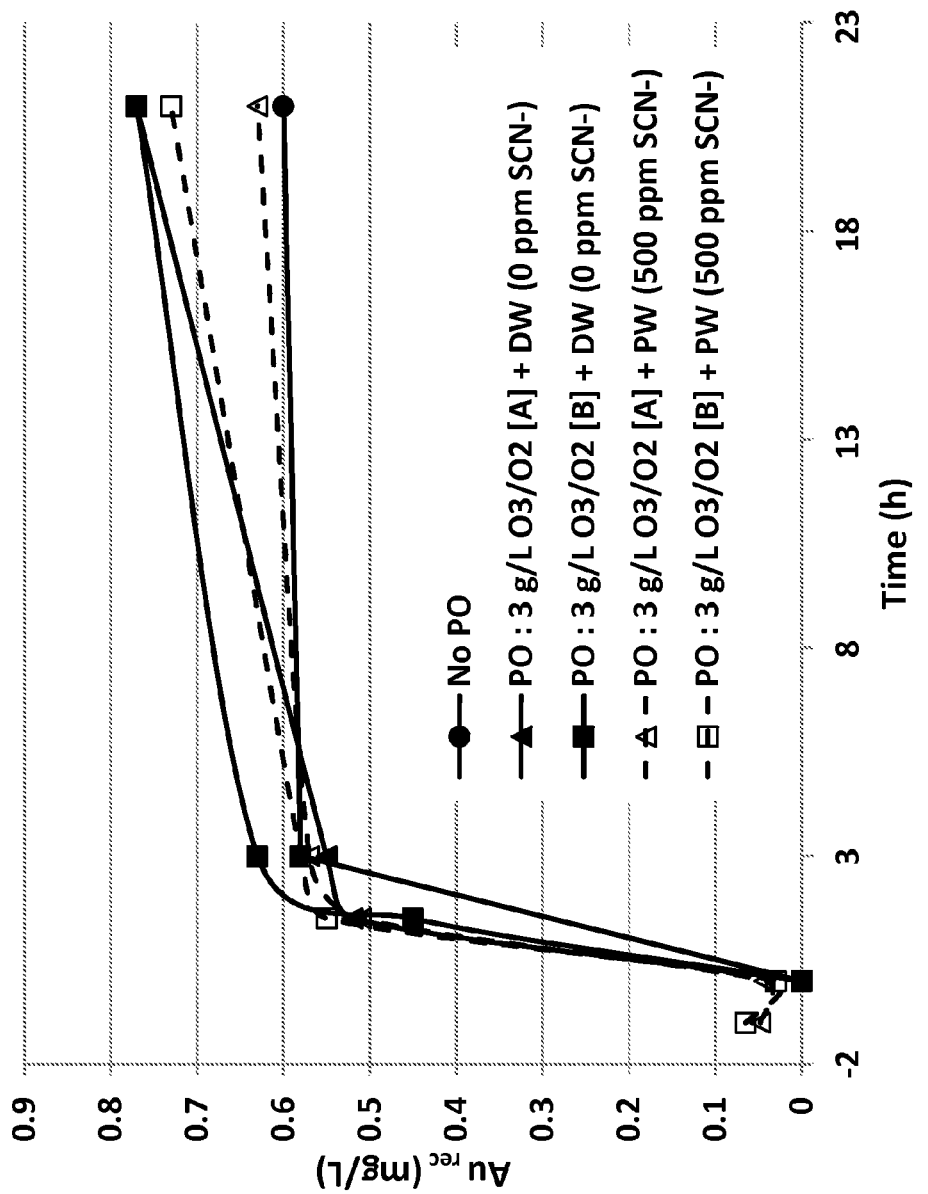
FIG. 6 is a graph showing kinetics of gold leaching during 21 hours of cyanidation and after two hours of pre-oxidation carried out in the presence of an oxidizing gas containing ozone and oxygen, for two ozone concentrations at an ozone dosage of 3 g/L in DW or PW.
Figure 7:
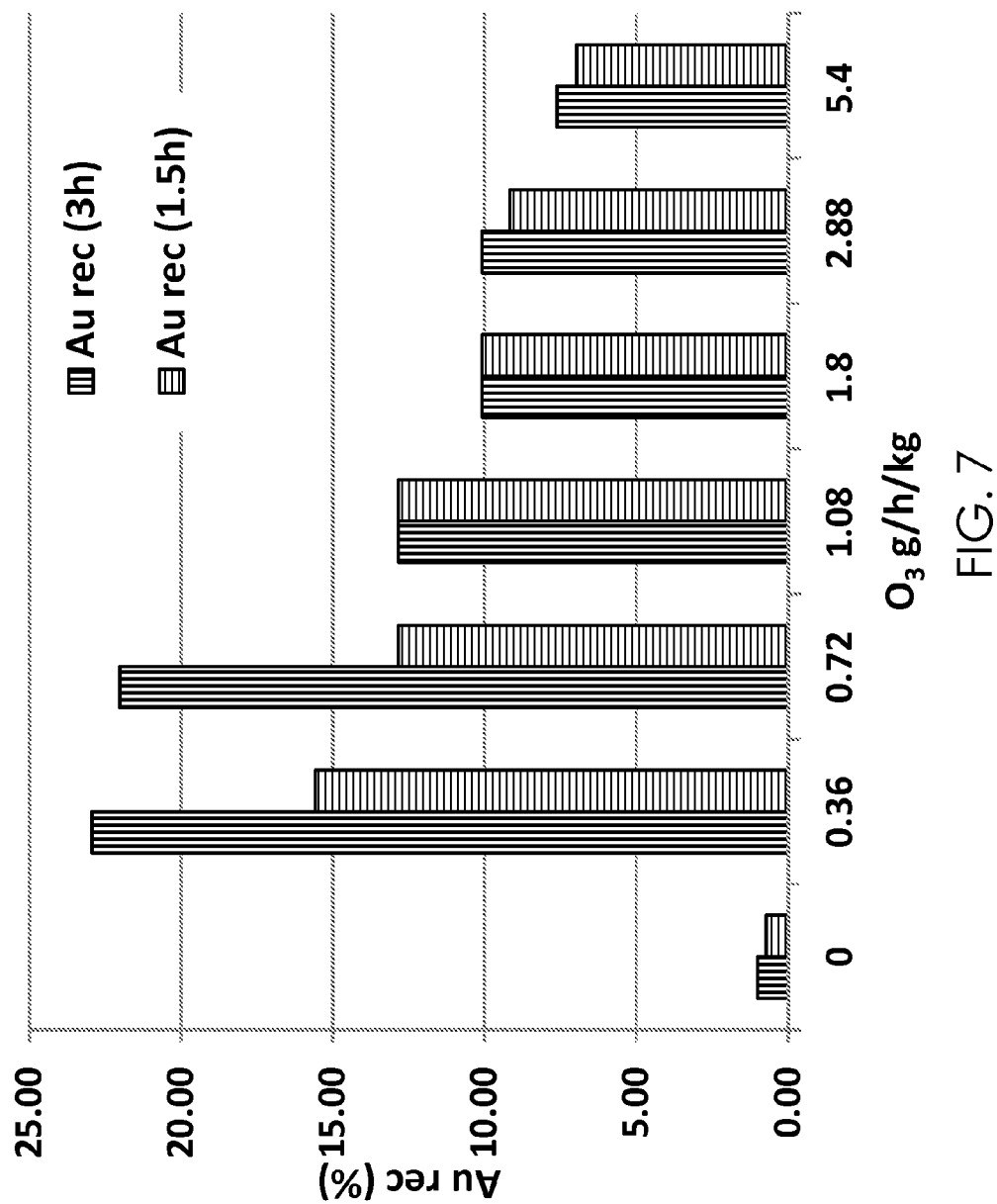
FIG. 7 is a graph showing comparative percentage of gold recovery after 1.5 hours and 3 hours of oxidation carried out in the presence of ozone, according to various ozone flowrates.
Figure 8:
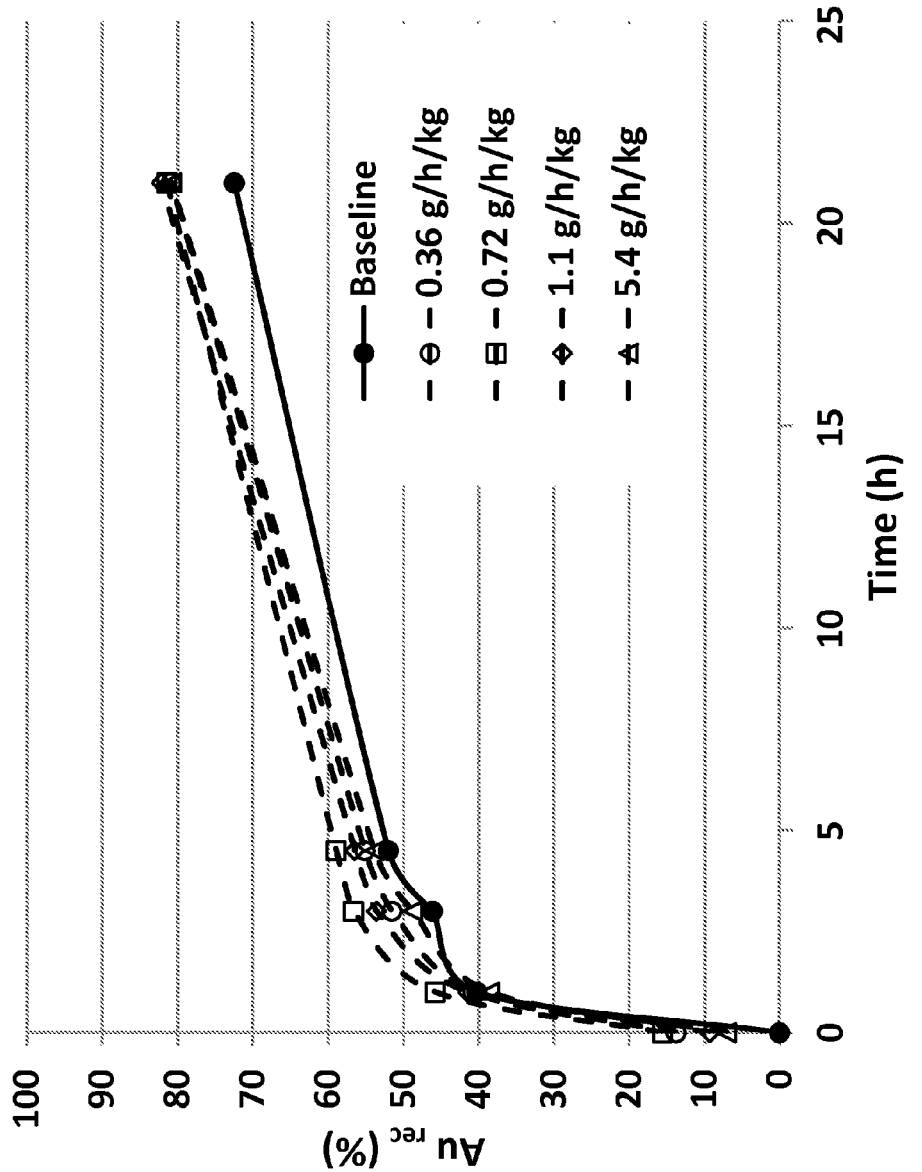
FIG. 8 is a graph showing variation of percentages of gold recovery during 21 hours of cyanidation and after two hours of pre-oxidation carried out in the presence of ozone, according to various ozone flowrates.

FIGS. 6 to 8 shows that carrying out a pre-oxidation step with a mixture of $O_3/O_2$ improved the precious metal recovery and, more particularly, gold recovery, in comparison with a direct cyanidation without pre-oxidation. FIG. 7 further shows that cyanidation of gold inherently occurs during the oxidation step while cyanide is produced from thiocyanate destruction.

More particularly, the gold recovery was evaluated following the pre-oxidation step (FIG. 7) and following the subsequent cyanidation step (FIGS. 6 and 8). In FIG. 6, a first test was carried without a pre-oxidation step. A second test was carried out with a pre-oxidation including an ozone dosage of 3 g/L in distilled water, i.e. without thiocyanate. A third test was carried out with a pre-oxidation including an ozone dosage of 3 g/L in distilled water. A fourth test was carried out with a pre-oxidation including an ozone dosage of 3 g/L in process water including 500 ppm of thiocyanates. A fifth test was carried out with a pre-oxidation including an ozone dosage of 3 g/L on process water including 500 ppm of thiocyanates.

The pre-oxidation with the mixture of $O_3/O_2$ led to an increase of gold recovery up to 20 wt % in specific cases (see FIG. 7). Moreover, it was observed that, before addition of cyanide at 0 hour, some gold was already leached during pre-oxidation. This is explained by the partial oxidation of the thiocyanates into cyanide, which reacts with gold before further oxidation into cyanate. This phenomenon may explain in part the overall gain on gold recovery.

Referring to FIG. 7, seven tests were performed to evaluate gold recovery after 1.5 h and 3 h of oxidation. The first test was performed without oxidation and the other six tests were performed with an ozone flowrate from 0.36 g/h/kg to 5.4 g/h/kg at an ozone concentration of 2.5% in a mixture of ozone and oxygen. The first test shows that up to 23 wt % of the gold in already recovered during the oxidation step. The best results regarding gold recovery after three hours were obtained with ozone flowrates of 0.36 g/h/kg and 0.72 g/h/kg. This may be explained by the fact that lower ozone flowrates enable to limit oxidation of cyanide according to above equation (ii), thereby leaving cyanide available for gold recovery.

Referring to FIG. 8, five complementary tests were carried out to evaluate gold recovery after 21 hours of cyanidation, the pulp having been pre-oxidized during two hours with a mixture of $O_3/O_2$ according to various ozone flowrates. A reference gold recovery profile was obtained for 21 hours of cyanidation without pre-oxidation step. In all cases, the gold recovery increased in comparison to the reference profile. The pre-oxidation step enabled to increase gold recovery up to about 10 wt % after 21 hours of cyanidation in specific cases as shown in Table 2 below. The Au gain is calculated according to the reference profile.

TABLE 2

| | $O_3$ (g/h/kg) | | | |
|---|---|---|---|---|
| | 0.36 | 0.72 | 1.1 | 5.4 |
| Au gain (%) | 8.3 | 8.9 | 9.6 | 8.3 |

Several tests were carried out to measure the thiocyanate formation during gold cyanidation after pre-oxidation with ozone at two concentrations A and B (concentration A: 2.5% and concentration B: 1%). Gold cyanidation was performed on several samples which were oxidized with different ozone dosages or flowrates of a mixture of ozone and oxygen and wherein the pulp included or not thiocyanates. The results were compared to a sample which was submitted to the gold cyanidation without a prior pre-oxidation with an oxidizing gas containing ozone (referred to as "Baseline" in FIG. 9)

Figure 9:
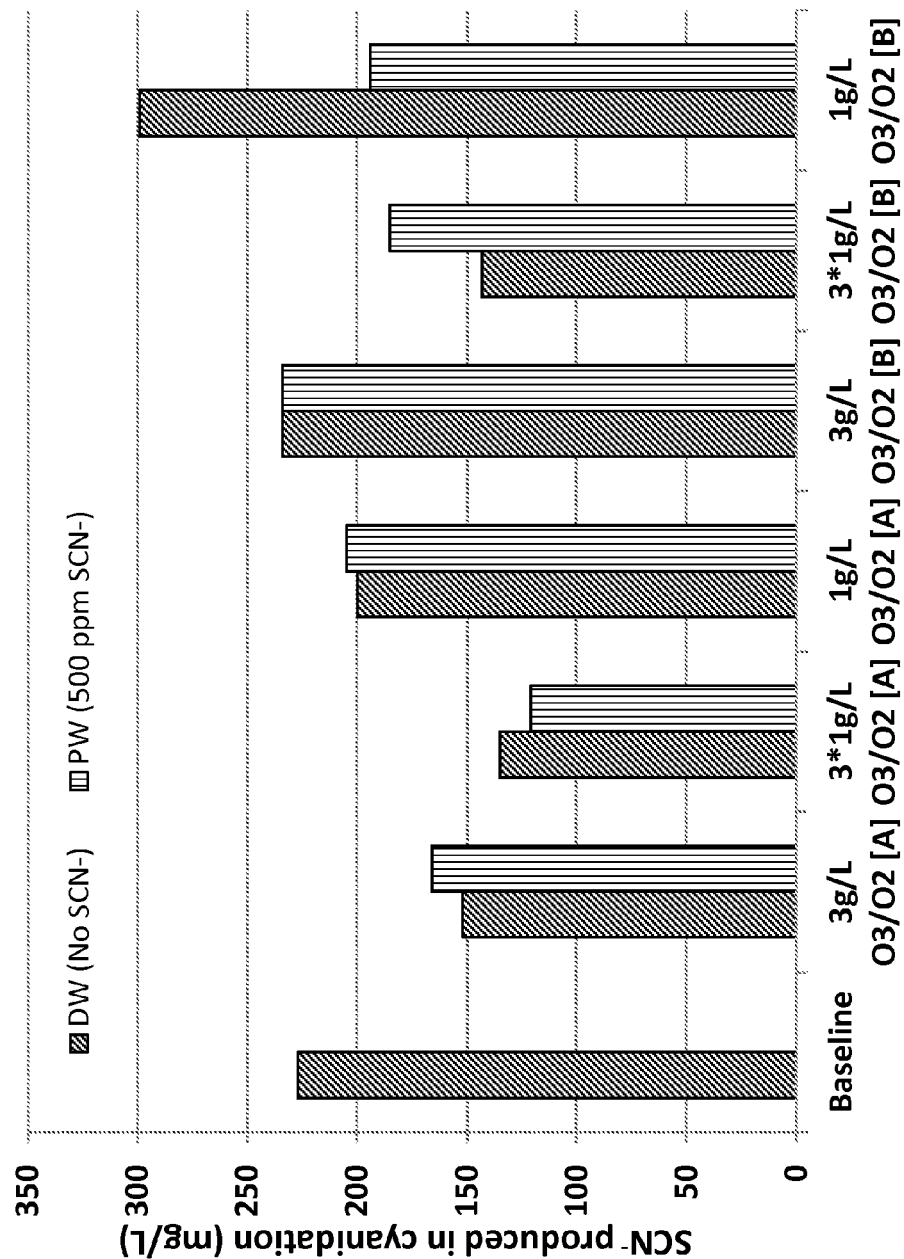
FIG. 9 is a graph showing thiocyanate formation after 21 hours of gold cyanidation and two hours of pre-oxidation carried out in the presence of ozone for various ozone contents and oxidizing gas compositions with DW and PW.

FIG. 9 shows the results of the tests carried out. From FIG. 9, it appears that intrinsic formation of thiocyanates during gold cyanidation is also hindered after two hours of pre-oxidation with ozone. More particularly, after 21 hours of cyanidation, a lower amount of thiocyanates was measured after pre-oxidation with 3 g/l of ozone. For a dosage of 1 g/l, only a slight decrease in thiocyanate formation was observed.

Figure 10:
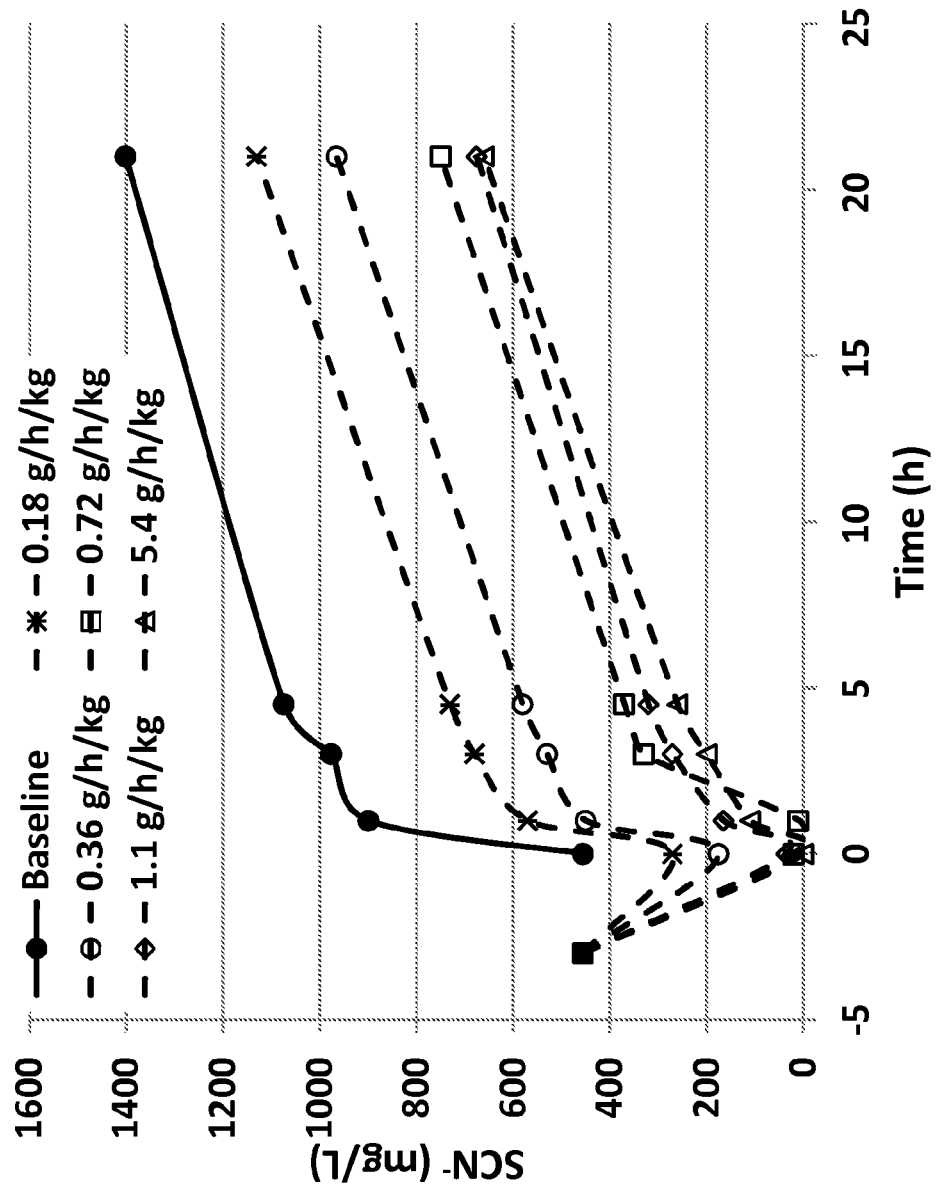
FIG. 10 is a graph showing thiocyanate formation during 21 hours of cyanidation, wherein a precious metal containing pulp was previously oxidized with an oxidizing gas containing ozone for 2 hours, according to various ozone flowrates.

Referring to FIG. 10, similar tests were performed on five pulp samples which were pre-oxidized with a mixture of oxygen and ozone having an ozone flowrate varying from 0.36 g/h/kg to 5.4 g/h/kg with an ozone concentration of 2.5% in oxygen. Table 3 provides thiocyanate formation after 2 hours of pre-oxidation followed by 21 hours of cyanidation. FIG. 10 and Table 3 show that thiocyanate formation decreases as the ozone flowrate increases.

TABLE 3

| | $O_3$ (g/h/kg) | | | | | |
|---|---|---|---|---|---|---|
| | 0 | 0.18 | 0.36 | 0.72 | 1.1 | 5.4 |
| SCN 21 h (mg/L) | 946 | 860 | 790 | 730 | 640 | 660 |

Figure 11:
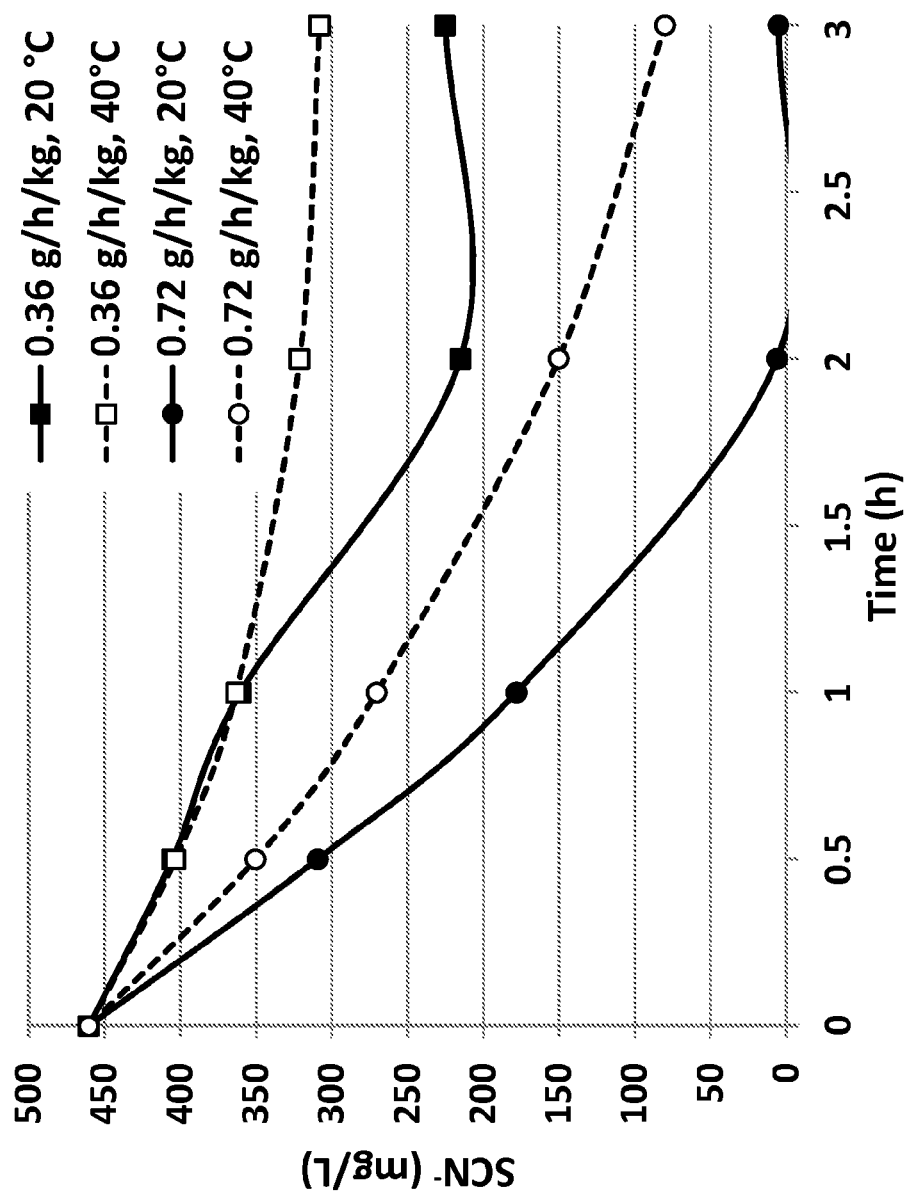
FIG. 11 is a graph showing kinetics of thiocyanate destruction during 3 hours of pre-oxidation, prior to cyanidation, with an oxidizing gas containing ozone at an ozone flowrate of 0.36 g($O_3$)/h/kg(of dry ore) or 0.72 g($O_3$)/h/kg(of dry ore) and a temperature of 20° C. or 40° C.

Four tests were further carried out to characterize the effect of temperature on thiocyanate destruction during ozone-based pre-oxidation for two different ozone flowrates and two different temperatures at an ozone concentration of 2.5% in a mixture of ozone and oxygen, as shown in FIG. 11. The destruction of thiocyanate slows with an increase of 20° C. for both flowrates. In an embodiment, the temperature for pre-oxidation can range between 12° C. and 50° C., optionally between 20° C. and 40° C.

Figure 12:
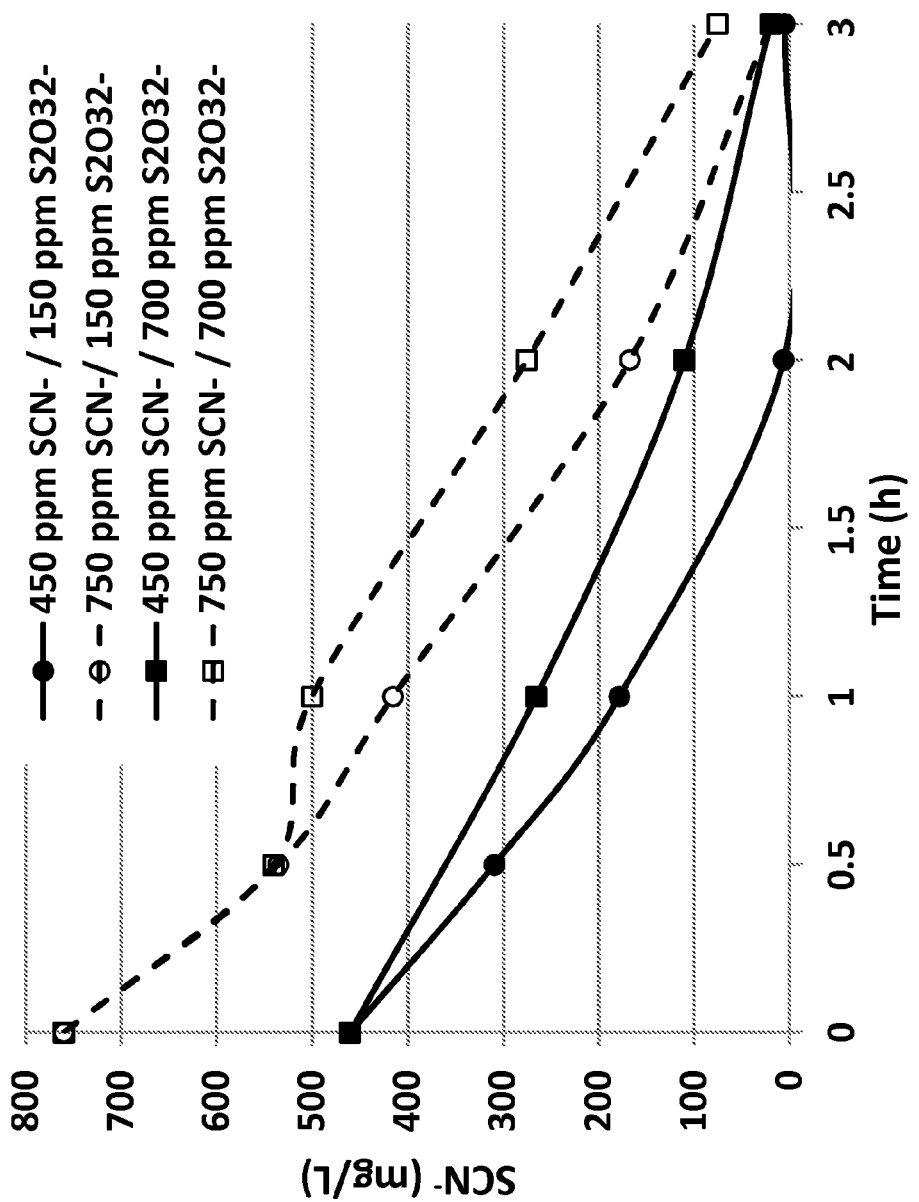
FIG. 12 is a graph showing kinetics of thiocyanate destruction during 3 hours of pre-oxidation, prior to cyanidation, with an oxidizing gas containing ozone at an ozone flowrate of 0.72 g($O_3$)/h/kg(of dry ore), with PW having an initial content of thiocyanate of 450 ppm or 750 ppm, and an initial content in $S_2O_3^{2-}$ of 150 ppm or 700 ppm.

Referring to FIG. 12, four tests were also performed to evaluate the effect of the presence of initial thiosulfate $S_2O_3^{2-}$ in the process water used for producing the pulp. The tests were carried out with a mixture of oxygen and ozone at an ozone flowrate of 0.72 g($O_3$)/h/kg. Two $S_2O_3^{2-}$ contents were tested as respective lower limit (150 ppm) and upper limit (700 ppm). These two $S_2O_3^{2-}$ contents were combined with either 450 ppm or 750 ppm of thiocyanates. As shown in FIG. 12, for a same initial thiocyanates content in the process water, the thiocyanates formation during oxidation is increased in presence of a greater initial quantity of thiosulfate in the process water. Indeed, under oxidizing conditions, thiosulfates are converted into thiocyanates according to above equation (iii). The thiocyanates formed by the conversion of thiosulfates are further oxidized in cyanide according to above equation (i).

It will be appreciated that the methods described herein may be performed in the described order, or in any other suitable order.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A process for recovering a precious metal from ore, the process comprises:
   adding process water containing thiocyanates to ore particles to obtain a pulp;
   contacting the pulp having a basic pH with an oxidizing gas containing ozone; and
   contacting the pulp with cyanide.

2. The process of claim 1, wherein contacting the pulp with cyanide further comprises adding cyanide to the pulp, subsequently to contacting the pulp with the oxidizing gas containing ozone.

3. The process of claim 1, wherein contacting the pulp with the oxidizing gas containing ozone and contacting the pulp with cyanide are at least performed simultaneously, the thiocyanates being converted to cyanide by contact with the oxidizing gas containing ozone.

4. The process as claimed in claim 1, wherein the process water containing thiocyanates added to the ore particles comprises recycled process water.

5. The process as claimed in claim 1, further comprising recovering the precious metal from the pulp after cyanidation thereof and producing the process water containing thiocyanates.

6. The process as claimed in claim 5, comprising recycling at least a part of the process water containing thiocyanates to form the pulp with the ore particles.

7. The process as claimed in claim 1, comprising controlling the pH of the pulp above 7 while contacting the pulp with the oxidizing gas containing ozone.

8. The process as claimed in claim 7, wherein the pulp has a pH above 10 when contacted with the oxidizing gas containing ozone.

9. The process as claimed in claim 7, wherein the pulp has a pH between about 10.5 and 11.5 when contacted with the oxidizing gas containing ozone.

10. The process as claimed in claim 2, wherein the pH of the pulp when the cyanide is added thereto is substantially equal to the pH of the pulp when the pulp is contacted with the oxidizing gas containing ozone.

11. The process as claimed in claim 1, comprising monitoring at least one of a thiocyanate concentration, a cyanide concentration and a precious metal recovery percentage after contacting pulp with cyanide.

12. The process as claimed in claim 11, comprising controlling at least one of an ozone flowrate, in gram of ozone per hour per kilogram of dry ore in the pulp, and an oxidation residence time to destroy at least 20 wt % of the thiocyanates initially contained in the process water.

13. The process as claimed in claim 12, comprising controlling at least one of the ozone flowrate and the oxidation residence time to destroy at least 90 wt % of the thiocyanates initially contained in the process water.

14. The process as claimed in claim 1, wherein the pulp is substantially free of thiocyanate before adding cyanide to the pulp.

15. The process as claimed in claim 1, wherein the oxidizing gas containing ozone has an ozone concentration ranging between 1% and 10%.

16. The process as claimed in claim 1, wherein the oxidizing gas containing ozone comprises a mixture of ozone and oxygen.

17. The process as claimed in claim 1, wherein the pulp has a temperature between about 12° C. and 50° C. when contacting the pulp with the oxidizing gas containing ozone.

18. The process as claimed in claim 1, wherein the pulp has a temperature between about 12° C. and 50° C.

19. The process as claimed in claim 1, wherein contacting the pulp with the oxidizing gas containing ozone lasts an oxidation time sufficient to destroy at least 20 wt % of the thiocyanates initially contained in the process water.

20. The process as claimed in claim 19, wherein the oxidation time is sufficient to oxidize substantially all the thiocyanates initially contained in the process water.

21. The process as claimed in claim 20, wherein the oxidation time is at most three hours.

* * * * *